Oct. 11, 1932.  F. G. BEETEM  1,882,473
EMERGENCY LIGHTING SYSTEM
Filed June 19, 1931
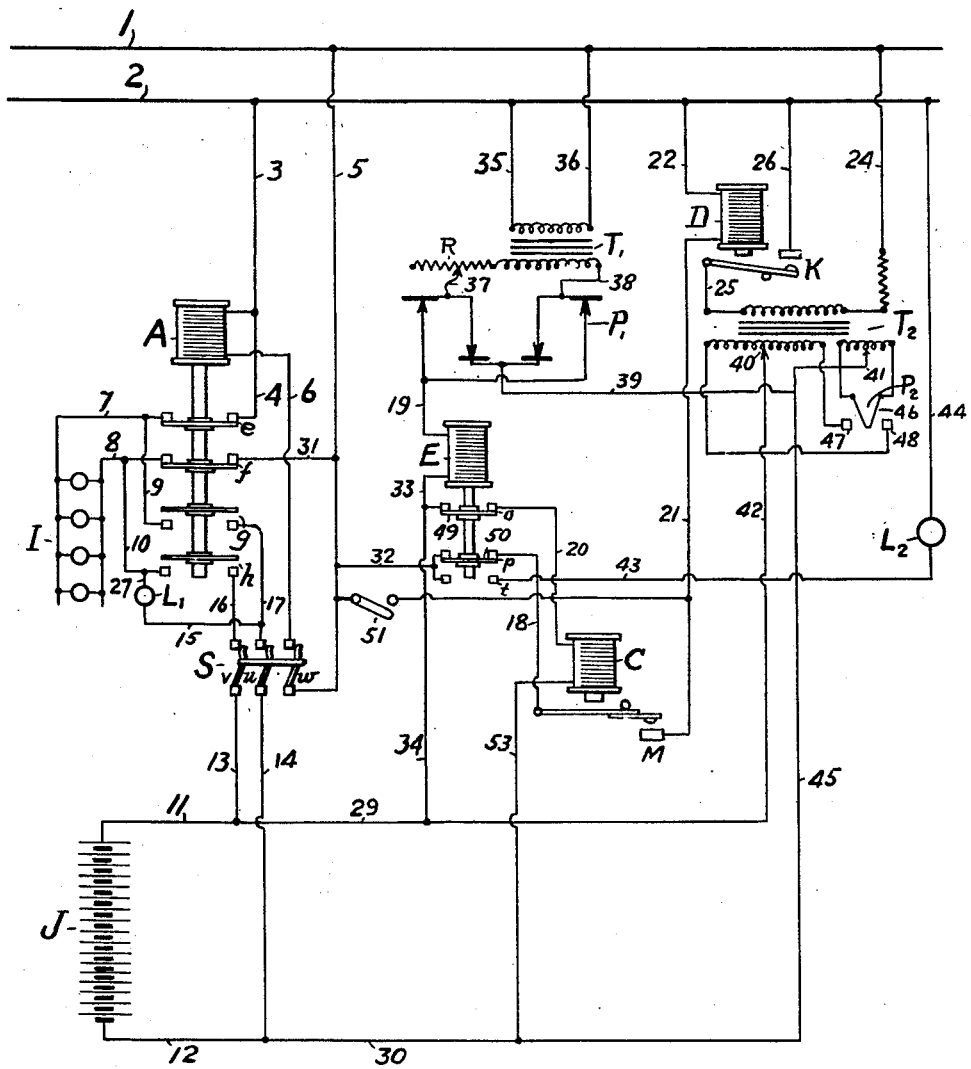
WITNESS:
INVENTOR
Frank G. Beetem
BY
Augustus B. Stoughton
ATTORNEY.

Patented Oct. 11, 1932

1,882,473

UNITED STATES PATENT OFFICE

FRANK G. BEETEM, OF PHILADELPHIA, PENNSYLVANIA

EMERGENCY LIGHTING SYSTEM

Application filed June 19, 1931. Serial No. 545,612.

Acknowledgment is made of my copending application, Serial No. 531,502, for an emergency lighting system, filed April 23, 1931.

My invention provides an emergency lighting circuit normally supplied from the usual source of current and a transfer switch to connect this circuit to a storage battery when the normal source of supply fails. Two circuits are supplied for furnishing charging current to the storage battery from the normal source, one of which supplies a small trickle charge current continuously and the other supplies a higher rate of charge after an emergency discharge. A relay responsive to the voltage of the battery is provided for opening the circuit over which the higher charging rate is supplied when the battery voltage reaches a certain predetermined value. Another relay is provided whose exciting coil is in series with the circuit furnishing the continuous trickle charge current, this relay being designed upon failure of its exciting current to open the exciting circuit of the voltage responsive relay and simultaneously to close a signal circuit.

My invention will be more clearly understood by reference to the following description and the accompanying drawing which shows diagrammatically an emergency lighting system embodying the invention.

In the drawing 1 and 2 are the alternating current supply mains. When the 3-pole single throw switch S is closed, the current flows from the alternating current supply mains, from main 1 through conductor 5, through switch blade $w$, conductor 6 to solenoid A, returning to the other side of the supply circuit 2 through conductor 3. The excitation of solenoid A causes the plunger of the automatic transfer switch to lift its four contact strips, closing the circuits at $e$ and $f$ and opening the circuits at $g$ and $h$. Emergency lights then obtain current from the normal supply mains 1 and 2. Current flows from conductor 1, through conductor 5, through conductor 31, across contact $f$, to conductor 8, through emergency lamps I to conductor 7, then through contacts $e$, returning through conductors 4 and 3 to conductor 2, the opposite side of the line.

If a failure of the normal alternating current supply occurs while switch S is closed, the excitation of solenoid A ceases and the plunger drops by gravity, so that the circuit through contacts $e$ and $f$ is opened and then completed through $g$ and $h$. Emergency lights are then supplied by current derived from the storage battery J. Current flows from the battery through conductors 11 and 13, blade $v$ of switch S, through conductor 16, through contacts $h$ to conductor 10, thence to 8 and lamps I, returning to the battery by way of conductors 7 and 9, contact $g$, 17, blade $u$, 14 to 12, the opposite polarity of the battery. When the A. C. supply is restored, the plunger of the automatic transfer switch A is pulled up again, the battery being disconnected from the emergency lamps and reconnected to the alternating current supply.

Two circuits for transmitting rectified charging current from the A. C. circuit 1, 2 to the battery are shown, one of which is designed to provide continuously a low-rate trickle charge current sufficient to compensate or slightly more than compensate for the internal losses of the battery and keep the latter fully charged during periods of idleness, while the other is designated to provide intermittently and particularly after every emergency discharge a higher charging rate sufficient to recharge the battery within a reasonable length of time after such emergency discharge.

For providing the continuous trickle charge current, a copper-copper-oxide rectifier $P_1$ is shown, connected by conductors 37, 38 and adjustable resistance R to the secondary winding of transformer $T_1$ whose primary winding is connected to the circuit 1, 2 by conductors 35, 36. One of the output terminals of the rectifier $P_1$ is connected to one terminal of the battery by conductor 19, exciting coil of relay E and conductors 33, 34, 29 and 11. The other output terminal of rectifier $P_1$ is connected to the other terminal of the battery by conductors 39, 45, 30 and 12.

For providing the higher rate charge the full wave thermionic rectifier $P_2$ is shown, whose filament 46 is excited from a secondary winding on transformer $T_2$ whose primary winding is connected to the circuit 1, 2 by conductors 24, 25, contacts K of relay D when these are closed, and 26. The two anodes 47 and 48 of this rectifier are connected to the opposite terminals of another secondary winding on transformer $T_2$. The mid points 41 and 40 of these two secondary windings constitute the output terminals of this rectifier, the terminal 41 being connected to one terminal of the battery by conductance 45, 30 and 12, and the terminal 40 being connected to the other terminal of the battery by conductors 42, 29 and 11.

The exciting coil of relay D is connected across circuit 1, 2, on the one side by conductor 22 and on the other by conductor 21, contacts M of relay C when these are closed, conductor 18, contacts $p$ of relay E and conductors 32 and 5.

The exciting coil of relay C is connected across the battery, on the one side by conductors 53, 30 and 12, and on the other by conductors 20, contacts $o$ of relay E and conductors 34, 29 and 11.

The exciting coil of relay E, as mentioned above, is connected in series with the output circuit of rectifier $P_1$. This relay controls a plunger carrying two contact members 49 and 50 which in the upper position of the plunger close the contacts $o$ and $p$. When the excitation of relay E drops below a certain value, the plunger drops by gravity and contact member 50 closes the contacts $t$, thus closing the circuit of a signal device $L_2$ (which may be a lamp or a bell or other such device), this circuit being traced from conductor 1 via 5, 32, contacts $t$, 43, $L_2$ and 44 to conductor 2.

The operation of the apparatus shown on the drawing and described above is as follows:

When the conditions on the supply circuit 1, 2 are normal and the switch S is closed, the plunger of the transfer switch A will be in its upper position and the emergency lights I will be supplied from the circuit 1, 2. A low rate trickle charge current will be furnished continuously to the battery through the rectifier $P_1$, this current passing through the exciting coil of the relay E, holding the plunger of this relay in its upper position, thus closing the contacts at $o$ and $p$. The exciting coil of the relay C will thus be connected across the battery terminals via conductors 11, 29, 34, contacts $o$, conductor 20 coil C, conductors 53, 30 and 12. The design of the relay C is such that with its exciting coil thus connected across the battery terminals and with the battery voltage at its normal value when subjected to the normal trickle charge current, the armature of the relay C will be held in its upper position and the contact at M will be open. This will keep the exciting circuit of the relay D open and the contact at K will therefore be open and no charging current will be supplied to the battery from the rectifier $P_2$.

Whenever the supply of current from the circuit 1, 2 fails by reason of an interruption or an abnormal drop in voltage on this circuit, the plunger of the transfer switch A will drop, disconnecting the emergency lighting circuit from the supply circuit 1, 2 and connecting it to the battery as already described. The failure on the supply circuit 1, 2 will also interrupt or reduce the trickle charge current delivered to the battery by the rectifier $P_1$, thus releasing the plunger of the relay E thereby opening the contact at $o$, the exciting current of the relay C will be interrupted and its armature will drop, closing the contact at M. However, the exciting circuit of the relay D although thus closed at the contact M will be open at the contact $p$. The drop of the plunger of relay E will also close the contact at $t$, establishing the circuit of the signal device $L_2$ as described above. However, owing to the failure on the supply circuit 1, 2, no signal will be given unless on the restoration of voltage across the circuit 1, 2 the relay E fails to lift its plunger, in which case current will be supplied to the signal $L_2$.

When normal conditions are restored on the circuit 1, 2 after an interruption as described above, the plunger of the relay E will be lifted by the normal trickle charge current which will be restored through the rectifier $P_1$ and the exciting circuit of the relay C will be reestablished across the battery terminals by the closing of contacts $o$. However, the normal voltage of the battery when subjected to the small trickle charge current will not be sufficient to lift the armature of the relay C although sufficient to hold the armature in its upper position when it has once been lifted. The contact at M will therefore remain closed after the restoration of voltage on the circuit 1, 2 and the contacts $p$ of the relay E will also be closed, thus establishing the circuit of the exciting coil of relay D which will lifts its armature and close the contact K, thus supplying the high rate charging current to the battery through rectifier $P_2$. This high rate charging current will continue to flow until the battery voltage has risen to a certain predetermined value corresponding to the beginning of the gasing period toward the completion of the charge. When the battery voltage has risen to this point, the excitation of relay C will be sufficient to lift its armature and open the contact at M, thus opening the exciting circuit of relay D whereby the contact at K will be opened and the high rate charging current will be interrupted, leaving only the low rate trickle charge flowing through rectifier $P_1$.

From the above description, it will be noted that a warning signal will be given by the signal device $L_2$ in case of various derangements of the apparatus and circuits. For example, if there is any interruption in the trickle charge circuit or failure of the rectifier $P_1$ or a sufficient reduction in the output of this rectifier, the plunger of the relay E will be released, giving a warning signal at $L_2$. An open circuit in the battery itself will cause such an interruption and give the signal.

It will be noted that the relay E has a double function in closing the circuit of the signal device $L_2$ and opening the circuit of the exciting coil of relay C, whenever the current through the exciting coil of the relay E drops below a certain value. The opening of the exciting circuit of relay C serves to reset this relay for the higher rate of charge from rectifier $P_2$ by closing the contact at M, and this occurs whenever the source of current fails on the supply circuit 1, 2, calling for an emergency discharge from the battery.

The opening of the contacts $p$ when the plunger of relay E is released is also an important function, since if the current in the exciting coil of E should drop due to some derangement in rectifier $P_1$ and the plunger thus be allowed to fall, the exciting current of relay C would be interrupted at contacts $o$, permitting the contact M to close. If the circuit including this contact M were not opened at $p$, the high rate charge would thus be started through the rectifier $P_2$ and this would continue indefinitely since the exciting circuit of relay C is open at contact $o$, and the battery would receive an excessive overcharge.

A manually operated switch 51 serves to short circuit the contact M when it is desired to give the battery a prolonged overcharge at the higher rate furnished by the rectifier $P_2$ without having this high rate charge interrupted by the action of the relay C.

A signal device $L_1$ is shown connected between conductor 10 and conductor 17, this circuit being energized from the battery when the plunger of the transfer switch A drops, thus indicating that the emergency lighting circuit I is being supplied from the battery.

I do not intend to be limited in the practice of my invention save as the scope of the prior art and of the attached claims may require.

I claim:

1. In an emergency lighting system, the combination of a normal supply circuit, a storage battery, a consumption circuit, a transfer switch for transferring the consumption circuit from the normal supply circuit to the battery and vice versa, two charging circuits for transmitting charging current from the normal supply circuit to the battery, whereof one is adapted to furnish a comparatively low current continuously and the other is adapted to furnish a higher rate intermittently, a voltage responsive relay having an exciting coil connected across the battery and adapted to interrupt the higher rate charging circuit at a predetermined battery voltage, a signal circuit, and a relay having its exciting coil connected in series with the low rate charging circuit, said relay being adapted to open the exciting circuit of the voltage responsive relay and simultaneously connect the signal circuit to a source of current when the current in its exciting coil drops to a predetermined value.

2. In an emergency lighting system, the combination of a normal supply circuit, a storage battery, a consumption circuit, a transfer switch for transferring the consumption circuit from the normal supply circuit to the battery and vice versa, two charging circuits for transmitting charging current from the normal supply circuit to the battery, whereof one is adapted to furnish a comparatively low current continuously and the other is adapted to furnish a higher rate intermittently, a voltage responsive relay having an exciting coil connected across the battery and adapted to interrupt the higher rate charging circuit at a predetermined battery voltage, a signal circuit, and a relay having its exciting coil connected in series with the low rate charging circuit, said relay being adapted when the current in its exciting coil drops to a predetermined value simultaneously to open the exciting circuit of the voltage responsive relay, to open a contact in series with the contact of the voltage responsive relay and to connect the signal circuit to a source of current.

FRANK G. BEETEM.